Jan. 15, 1952 P. P. HONEGGER 2,582,631
COCK
Filed Oct. 9, 1945
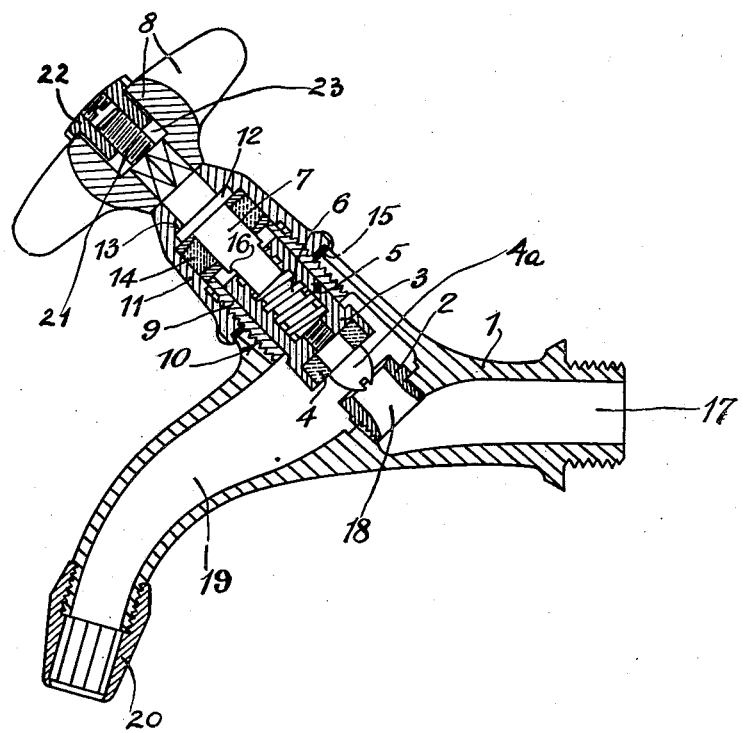
INVENTOR
PIERRE PAUL HONEGGER
By Maxwell E. Sparrow
AGENT Patented Jan. 15, 1952

2,582,631

UNITED STATES PATENT OFFICE 2,582,631

COCK

Pierre Paul Honegger, Conches, Switzerland

Application October 9, 1945, Serial No. 621,370
In Switzerland October 11, 1944

11 Claims. (Cl. 251—48)

The present invention relates to a cock comprising a screwed packing gland and a valve which, during its opening and closing movements, slides without revolving, this cock being characterised in that the means angularly immobilising the valve are secured to or form part of the packing gland, the whole contrivance being arranged in such a way that, at the end of the opening stroke, the valve governs the packing gland.

The single figure of the attached drawing represents, by way of example, the section through the median plane of one embodiment of the cock according to the invention.

The cock represented comprises a body 1, fitted with a seat 2 adapted to cooperate with a valve 3, the closure element of which is visible at 4 and is secured by element 4a to the member 3. This valve consists of a part 5 of a prismatic shape with a square section, threaded interiorly and screwed onto the screw portion 6 of spindle 7, which spindle is operated by means of an actuating or hand engaging member 8. The square part 5 of the valve forms a nut on the screw 6 and slides inside a sleeve 9 having a square inner cross-section which is screwed partly into the body 1 at 10 and partly into the cap 11. This sleeve 9 is formed, preferably, from a length of internally profiled tubing, cut to the desired size and threaded on the outside. It is clear that, when the cap 11 is locked on the sleeve 9, it forms a lock-nut for the latter, which then prevents the valve 3 from turning while at the same time leaving the valve free to slide under the influence of the rotation imparted to the screw 6 by the actuating member 8. The spindle 7 is fixed against movement in an axial direction by means of a collar 12 with which it is provided and which is held in place, on the one hand, by a shoulder 13 in the cap 11 and, on the other hand, by the watertight packing 14 against which the end of the sleeve 9 exerts a pressure, as will be more particularly explained hereinbelow, this sleeve constituting the screwed packing gland.

The cock represented functions as follows:

Let it be supposed that the cap 11, the packing gland 9 and the valve 3 assembled beforehand round the spindle 7 have just been mounted on the body 1, as shown in the drawing. The free end of the packing gland 9 is screwed at 10 onto the body 1, while keeping the cap 11 and the actuating member 8 angularly fixed in relation to each other, the valve being in the proximity of its completely open position, as shown in the drawing. The sleeve 9 constituting the packing gland is continued to be screwed onto body 1 until the cap 11 meets the watertight washer 15 positioned to be squeezed between it and the body 1. At that moment, the valve 3 is brought to the limit of its opening stroke until the shoulder 16 of spindle 7 meets the end of the valve body 3 and the rotation of the actuating member 8 is continued in the direction of the opening of the valve. This has the effect of locking on the screw 6 the valve 3, forming a nut on it (the screw 6 and the sleeve 9 being threaded in opposite directions), which makes the valve 3 rotate with the screw 6, the valve 3 necessarily bringing the sleeve 9 along with it because of the square shape of part 5. The packing gland 9 is thus drawn into a direction to tighten the packing 14 when the rotation of the actuating member of the cock in the direction of the opening of the valve is continued, after it has stopped relative to the valve 3. Action on the member 8 is continued until the packing gland is sufficiently tight, then the cap 11 is turned in the direction of screwing on to the sleeve 9 until it is locked on this sleeve, thus forming a lock-nut for it, the part 10 of the body 1 forming the nut. From that moment, it suffices to turn the actuating member 8 in the direction of the closing of the valve 3 for the cock to be ready to function. In fact, with the cap 11 then locking the packing gland, the valve 3 of this packing gland no longer follows the rotation of the screw 6.

If it is desired subsequently to retighten the packing gland, the cap 11 is unlocked by slightly unscrewing it and action on the member 8 is taken as has been described to effect the desired tightening of the joint 4, and this cap is again locked.

In a modified form of the invention, the packing gland 9 need not be in direct contact with the valve 3; it may be provided with a guide which immobilizes angularly the valve in relation to the packing gland and in which the valve will shift without turning, as in the example described.

In a conventional manner the body 1 of the cock is provided with the inlet 17 and outlet spout 19, to the latter of which is screw-threadedly attached the spout member 20. The opening 18 through the seat member 2 offers a communicating passage between inlet passage 17 and outlet passage 19.

The spindle 7 may be secured to actuating member 8 by any suitable means, such as by providing the spindle 7 with the threaded extension 21 projecting within the recess 23 of member 8, extension 21 being engaged by a flanged nut element 22.

What I claim is:

1. A cock comprising, in combination, a housing including a tubular extension having an internally screw threaded portion; an annular packing located within said tubular extension at one end thereof; an externally screw threaded tubular packing gland threadedly engaging said internally screw threaded portion of said tubular extension and pressing against said annular packing so as to compress the same; a valve member slidably but non-rotatably mounted within and with respect to said packing gland; and operating means extending through said tubular extension and said annular packing and connected to said valve member so as to move the said valve member axially but not rotatably with respect to said packing gland, said compression of said annular packing by said packing gland causing said annular packing to bear against said operating means and prevent leakage between said packing and operating means.

2. A cock comprising, in combination, a housing, including a tubular extension having an internally screw threaded portion; an annular packing located within said tubular extension at one end thereof; an externally screw threaded tubular packing gland threadedly engaging said internally screw threaded portion of said tubular extension and located in pressing engagement with said annular packing so as to compress the same; a valve member and means for mounting the valve member within said packing gland so as to move only axially with respect thereto; and operating means extending through said tubular extension and said annular packing and connected to said valve member so as to move the said valve member axially but not rotatably with respect to said packing gland, said compression of said annular packing by said packing gland causing said annular packing to bear against said operating means and prevent leakage between said packing and operating means.

3. A cock comprising, in combination, a housing including a tubular extension having an internally screw threaded portion; an annular packing located within said tubular extension at one end thereof at a point spaced from said screw threaded portion; an externally screw threaded tubular packing gland threadedly engaging said internally screw threaded portion of said tubular extension and pressing at one end thereof against said annular packing so as to compress the same; a valve member slidably but non-rotatably mounted within and with respect to said packing gland; and operating means extending through said tubular extension and said annular packing and connected to said valve member so as to move the said valve member axially but not rotatably with respect to said packing gland, said compression of said annular packing by said packing gland causing said annular packing to bear against said operating means and prevent leakage between said packing and operating means.

4. A cock comprising, in combination, a housing including a tubular extension having an internally screw threaded portion; an annular packing located within said tubular extension at one end thereof; an externally screw threaded tubular packing gland threadedly engaging said internally screw threaded portion of said tubular extension and forcefully abutting at one end thereof against said annular packing so as to compress the same, the opening through said packing gland having a polygonal cross section; a valve member having a polygonal cross section which mates with the said opening of said packing gland and which is slidably mounted within said packing gland; and operating means extending through said tubular extension and said annular packing and connected to said valve member so as to move the said valve member axially but not rotatably with respect to said packing gland, said compression of said annular packing by said packing gland causing said annular packing to bear against said operating means and prevent leakage between said packing and operating means.

5. A cock comprising, in combination, a housing including a tubular extension having an internally screw threaded portion at one end thereof; an annular packing located within said tubular extension at a point spaced from said screw threaded portions; an externally screw threaded tubular packing gland threadedly engaging said internally screw threaded portion of said tubular extension and compressively abutting at one end thereof against said annular packing so as to compress the same; a valve member slidably but non-rotatably mounted within and with respect to said packing gland; and operating means extending through said tubular extension and said annular packing and connected to said valve member so as to move the said valve member axially but not rotatably with respect to said packing gland, said compression of said annular packing by said packing gland causing said annular packing to bear against said operating means and prevent leakage between said packing and operating means.

6. A cock comprising, in combination, a housing including a tubular extension having an internally screw threaded portion; an annular packing located within said tubular extension at one end thereof; an externally screw threaded tubular packing gland threadedly engaging said internally screw threaded portion of said tubular extension and forcefully abutting at one end thereof against said annular packing so as to compress the same; a valve member slidably but non-rotatably mounted within and with respect to said packing gland; and operating means extending through said tubular extension and said annular packing and threadedly connected to said valve member so as to move the said valve member axially but not rotatably with respect to said packing gland, said compression of said annular packing by said packing gland causing said annular packing to bear against said operating means and prevent leakage between said packing and operating means.

7. A cock comprising, in combination, a housing including a tubular extension having an internally screw threaded portion; an annular packing located within said tubular extension at one end thereof; an externally screw threaded tubular packing gland threadedly engaging said internally screw threaded portion of said tubular extension and located with one end thereof pressing against said annular packing so as to compress the same; a valve member slidably but non-rotatably mounted within and with respect to said packing gland; and operating means comprising a cylindrical shaft extending through said tubular extension and said annular packing and threadedly connected to said valve member so as to move the said valve member axially but not rotatably with respect to said packing gland; the compression of said annular packing by said packing gland causing the inner peripheral face of said annular packing to be forcefully spread out against a substantial outer peripheral surface portion of said cylindrical shaft so as to prevent leakage between the same and said annular packing, and the said cylindrical shaft having a shoulder located above the said valve member so as to limit the opening movement of said valve member with respect to said cylindrical shaft, the continued turning of the said cylindrical shaft in valve opening direction after said valve member has contacted said shoulder causing the said packing gland to turn with the said valve member due to said non-rotatable mounting of said valve member with respect to said packing gland, whereby the adjustment of said packing gland with respect to said annular packing is effected.

8. A cock comprising, in combination, a housing including a tubular extension having an internally screw threaded portion; an annular packing located within said tubular extension at one end thereof; an externally screw threaded tubular packing gland threadedly engaging said internally screw threaded portion of said tubular extension and located with one end thereof pressing against said annular packing so as to compress the same, the opening through said packing gland having a polygonal cross section; a valve member having a polygonal cross section which mates with the said opening of said packing gland and which is slidably mounted within said packing gland; and operating means comprising a cylindrical shaft extending through said tubular extension and said annular packing and connected to said valve member so as to move the said valve member axially but not rotatably with respect to said packing gland, the compression of said annular packing by said packing gland causing the inner peripheral face of said annular packing to be forcefully spread out against a substantial outer peripheral surface portion of said cylindrical shaft so as to prevent leakage between the same and said annular packing, and the said cylindrical shaft having a shoulder located above the said valve member so as to limit the opening movement of said valve member with respect to said cylindrical shaft, the continued turning of the said cylindrical shaft in valve opening direction after said valve member has contacted said shoulder causing the said packing gland to turn with the said valve member due to said non-rotatable mounting of said valve member with respect to said packing gland, whereby the adjustment of said packing gland with respect to said annular packing is effected.

9. A cock comprising, in combination, a housing including a tubular extension having an internally screw threaded portion at one end thereof; an annular packing located within said tubular extension at a point spaced from said screw threaded portion; an externally screw threaded tubular packing gland threadedly engaging said internally screw threaded portion of said tubular extension and located with one end thereof pressing against said annular packing so as to compress the same; a valve member slidably but non-rotatably mounted within and with respect to said packing gland; and operating means comprising a cylindrical shaft extending through said tubular extension and said annular packing and threadedly connected to said valve member so as to move the said valve member axially but not rotatably with respect to said packing gland, the compression of said annular packing by said packing gland causing the inner peripheral face of said annular packing to be forcefully spread out against a substantial outer peripheral surface portion of said cylindrical shaft so as to prevent leakage between the same and said annular packing, and the said cylindrical shaft having a shoulder located above the said valve member so as to limit the opening movement of said valve member with respect to said cylindrical shaft, the continued turning of the said cylindrical shaft in valve opening direction after said valve member has contacted said shoulder causing the said packing gland to turn with the said valve member due to said non-rotatable mounting of said valve member with respect to said packing gland, whereby the adjustment of said packing gland with respect to said annular packing is effected.

10. A cock comprising, in combination, a substantially tubular housing member being internally threaded adjacent one end portion thereof; an annular, yielding packing mounted in said tubular housing member adjacent the other end portion thereof; an externally threaded tubular packing gland threadedly engaging said internally threaded one end portion of said tubular housing member and being located with one end thereof pressing against said annular packing so as to compress the same; a valve member slidably but not rotatably mounted within and with respect to said packing gland; and operating means comprising a cylindrical shaft extending through said tubular housing and said annular packing and threadedly connected to said valve member so as to move said valve member axially but not rotatably with respect to said packing gland, the compression of said annular packing by said packing gland causing the inner peripheral face of said annular packing to forcefully spread out against a substantial outer peripheral surface portion of said cylindrical shaft so as to prevent leakage between the same and said annular packing, and the said cylindrical shaft having a shoulder located above said valve member so as to limit the opening movement of said valve member with respect to said cylindrical shaft, the continued turning of said cylindrical shaft in valve opening direction after said valve member has contacted said shoulder causing said packing gland to turn with said valve member due to said non-rotatable mounting of said valve member with respect to said packing gland, whereby the adjustment of said packing gland with respect to said annular packing is effected.

11. A cock comprising, in combination, a substantially tubular housing member being internally threaded adjacent one end portion thereof; an annular, yielding packing mounted in said tubular housing member adjacent the other end portion thereof; an externally threaded tubular packing gland threadedly engaging said internally threaded one end portion of said tubular housing member and being located with one end thereof pressing against said annular packing so as to compress the same; a valve member slidably but not rotatably mounted within and with respect to said packing gland; and operating means comprising a handle bearing against said other end portion of said tubular housing member and a cylindrical shaft fixedly connected to said handle and extending through said tubular housing and said annular packing and threadedly connected to said valve member so as to move said valve member axially but not rotatably with respect to said packing gland, the compression of said annular packing by said packing gland causing the inner peripheral face of said annular packing to forcefully spread out against a substantial outer peripheral surface portion of said cylindrical shaft so as to prevent leakage between the same and said annular packing; and the said cylindrical shaft having a shoulder located above said valve member so as to limit the opening movement of said valve member with respect to said cylindrical shaft, the continued turning of said cylindrical shaft in valve opening direction after said valve member has contacted said shoulder causing said packing gland to turn with said valve member due to said non-rotatable mounting of said valve member with respect to said packing gland, whereby the adjustment of said packing gland with respect to said annular packing is effected.

PIERRE PAUL HONEGGER.

REFERENCES CITED

The following references are of record in the file of this patent:

UNITED STATES PATENTS

| Number | Name | Date |
|---|---|---|
| 691,813 | Saxton | Jan. 28, 1902 |
| 1,169,306 | Valmore | Jan. 25, 1916 |
| 1,348,854 | Eilers | Aug. 10, 1920 |
| 1,414,118 | Eller | Apr. 25, 1922 |
| 1,937,313 | Brotz | Nov. 28, 1933 |
| 2,318,964 | Parker | May 11, 1943 |

FOREIGN PATENTS

| Number | Country | Date |
|---|---|---|
| 27,945 | Netherlands | of 1932 |
| 448,120 | Great Britain | of 1936 |